May 18, 1926.  1,585,567
J. C. SOMMER
AUTOMOBILE SPEED GOVERNOR
Filed Dec. 15, 1924
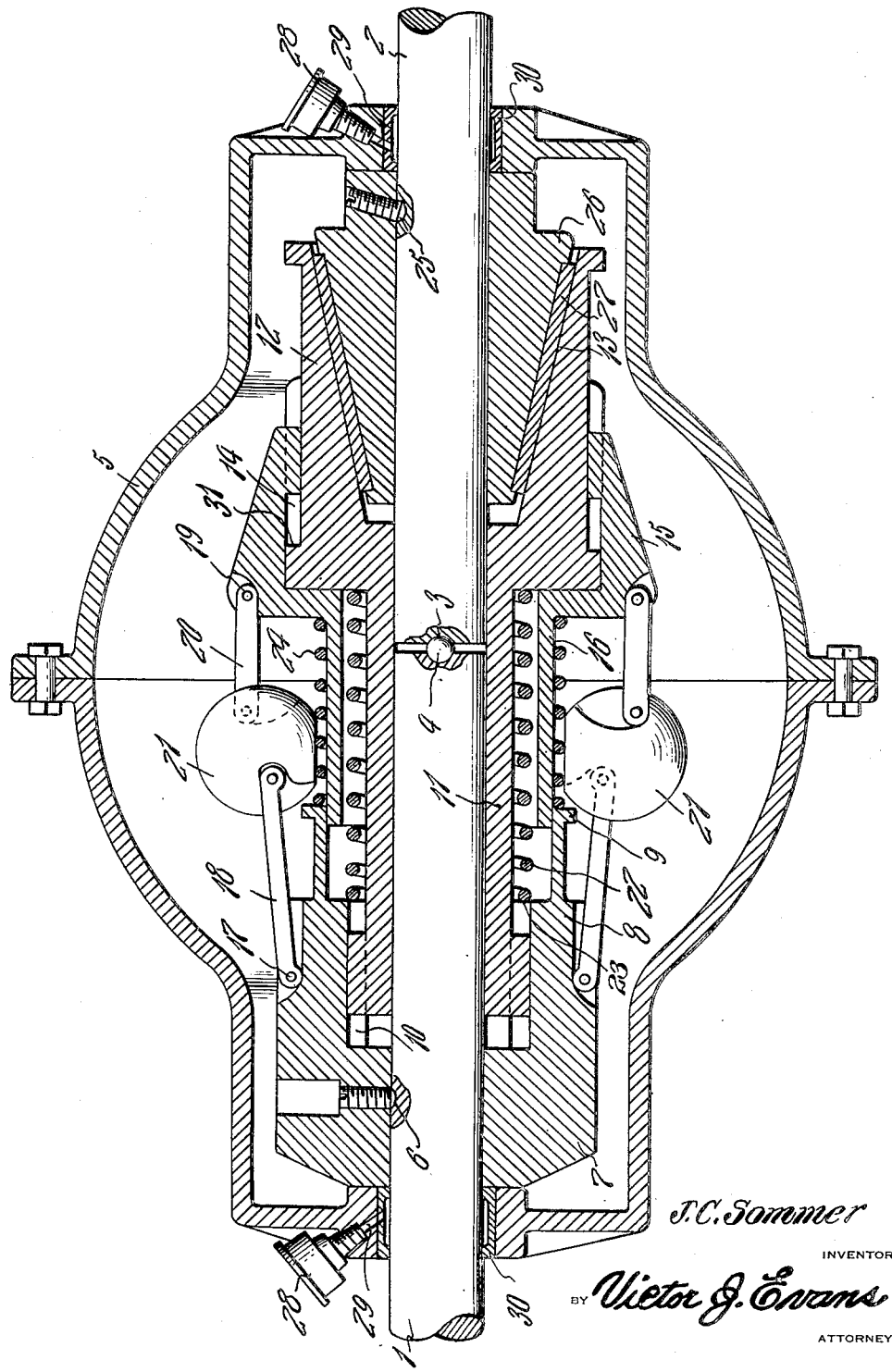
J. C. Sommer
INVENTOR
BY Victor J. Evans
ATTORNEY Patented May 18, 1926.

UNITED STATES PATENT OFFICE.

JOHN C. SOMMER, OF SAGINAW, MICHIGAN.

AUTOMOBILE SPEED GOVERNOR.

Application filed December 15, 1924. Serial No. 756,097.

The object of my said invention is the provision of an automobile speed governor that is compact, is made up of a minimum number of working parts, and is reliable in operation and durable in service.

Other objects and practical advantages of the invention will be fully understood from the following description and claims when the same are read in connection with the drawing, accompanying and forming part of this specification, in which:—

The figure is a longitudinal diametrical section of the governor constituting the preferred embodiment of my invention.

I show in the drawing a shaft section 1 adapted to be connected with the motor of an automobile and I also show a shaft section 2 designed to be connected with the usual differential mechanism of an automobile and which differential mechanism, in turn, is designed to be connected with the drive wheels. The confronting ends of the shaft sections 1 and 2 are centrally recessed as designated by 3, and in the said recesses is disposed an anti-friction ball 4.

Mounted on and surrounding the shaft sections 1 and 2 is a sectional casing 5, said casing 5 being designed to contain oil which will be splashed by the circular movement of the centrifugal means hereinafter explicitly described.

Appropriately fixed at 6 to the shaft 1 as by the set screw shown is a body 7 having a tubular extension 8 and an outwardly directed flange 9 at the inner end of the said extension.

Splined at 10 in the tubular extension 8 of said body 7 is a rectilinearly movable sleeve 11 at the inner end of which is a female friction clutch member 12, the bore of said member 12 being of taper form and being designated by 13.

Splined or longitudinally keyed at 14 to the clutch member 12 is a member 15 provided with a tubular extension 16.

Pivotally connected at 17 to the body 7 are arms 18, and pivotally connected at 19 to the member 15 are arms 20. The adjacent ends of the said arms 18 and 20 are pivotally connected to centrifugal balls or heavy members 21.

Surrounding the sleeve of the clutch member 12 is a coiled spring 22 which is interposed between the comparatively large portion of the clutch member 12 and an interior abutment 23 of the body 7, and tends to press the clutch member 12 toward the right and to yieldingly hold said clutch member 12 against movement in the opposite direction.

Surrounding the tubular portion 16 of the member 15 and interposed between the comparatively large portion of said member 15 and the flanged end of the body 7 is a coiled expansion spring 24 which has for its function to cushion movement of the member 15 toward the left and to yieldingly resist such movement as well as to move the member 15 toward the right.

Surrounding the shaft section 2 and fixed thereto preferably by a set screw 25 is a tapered male friction clutch member 26 provided with a facing 27 of leather or other appropriate friction creating material.

The casing 5 is provided at its end with oil cups 28 connected by ducts 29 with the surfaces of the shaft sections 1 and 2. The bearings for the shaft sections at the ends of the casing 5 are formed by bushings 30 of bronze or other appropriate material, the said bushings being chambered as illustrated in order to retain lubricant in contact with the shaft section. The bushings 30 are formed with openings communicating with the ducts 29, as shown.

In the practical operation of my novel governor it will be manifest that when the shaft 1 is rotated, the balls or weights 21 will be thrown outwardly by centrifugal action, and hence the member 15 will be moved toward the left on the clutch member 12. When a certain predetermined speed is obtained the member 15 will be caused to abut at 31 against the clutch member 12 with the result that further outward movement of the balls or weights 21 will be attended by movement of the clutch member 12 toward the left and disengagement of the said clutch member 12 from the clutch member 26 with the result that driving of the shaft section 2 from the shaft section 1 will be interrupted. When, however, the speed of rotation of the shaft 1 is reduced, the spring 24 will operate to move the member 15 toward the right relative to the clutch member 12, and the spring 22 will operate to move the said clutch member 12 toward the right so as to reengage the said member 12 with the clutch member 26 and bring about a resumption of the drive of the shaft section 2. From this latter it follows that the different speeds at which the governor will throw out of gear the shaft section 2 is solely controlled by different springs of different tensions, the speed at which the shaft section 2 will be disconnected from the shaft section 1 being determined at the time of manufacture and according to the discretion of the manufacturer.

I have specifically described the construction and relative arrangement of the parts embraced in the preferred embodiment of my invention in order to impart an exact understanding of the said embodiment and all of its details. I do not desire, however, to be understood as confining myself to the said specific construction and relative arrangement of parts inasmuch as the scope of my invention is defined by my appended claims and within said claims changes or modifications may be made without involving departure from my invention.

Having described my invention, what I claim and desire to secure by Letters Patent, is:—

1. In an automobile speed governor, the combination of alined shaft sections, antifriction means interposed between the confronting ends of said sections, a casing surrounding the meeting portions of the shaft sections, a tapered friction clutch member surrounding and fixed to one of the shaft sections, a body surrounding and fixed to the other shaft section and having an inwardly extending tubular extension, a friction clutch member splined in said tubular extension of the body and having an enlarged portion and a taper bore therein, a coiled spring surrounding said friction clutch member and interposed between the enlarged portion thereof and an abutment of the body, a member splined on the said friction clutch member and adapted in one position to abut against the same and having a tubular extension guided in the tubular extension of the body, a coiled spring surrounding said tubular portion of said splined member and interposed between an abutment thereof and an opposite abutment on the body, centrifugal bodies, and arms connecting said bodies with the said splined member and the body that is fixed on one of the shaft sections.

2. In an automobile speed governor, the combination of shaft sections in endwise alinement, a clutch member on one of said shaft sections, a clutch member connected with the other shaft section to turn with and move endwise relative to the same, a spring backing the last-named clutch member, a member splined to the last-named clutch member, a spring backing said splined member, and centrifugal means connected with said splined member and also connected with one of the shaft sections.

In testimony whereof I affix my signature.

JOHN C. SOMMER.